US005784504A

United States Patent [19]
Anderson et al.

[11] Patent Number: 5,784,504
[45] Date of Patent: Jul. 21, 1998

[54] DISAMBIGUATING INPUT STROKES OF A STYLUS-BASED INPUT DEVICES FOR GESTURE OR CHARACTER RECOGNITION

[75] Inventors: William Joseph Anderson, Raleigh, N.C.; Nicos John Anthony, Purdys; Doris Chin Chow, Mt. Kisco, both of N.Y.; Colin George Harrison, Brookfield, Conn.; Tanarug Issadisai, Ossining, N.Y.; Howard Geza Page, Tinton Falls, N.J.

[73] Assignee: International Business Machines Corporation, Armonk, N.Y.

[21] Appl. No.: 188,600

[22] Filed: Jan. 24, 1994

Related U.S. Application Data

[63] Continuation of Ser. No. 869,593, Apr. 15, 1992.
[51] Int. Cl.$^6$ ............................................ G06F 3/00
[52] U.S. Cl. ..................... 382/309; 345/358; 345/173; 345/179
[58] Field of Search ..................... 345/179, 180, 345/181, 182, 183, 173, 7, 156, 326, 358; 382/189, 187, 160, 186, 119, 181, 358, 309–311; 395/157, 155, 804

[56] References Cited

U.S. PATENT DOCUMENTS

| 4,727,588 | 2/1988 | Fox et al. | 382/13 |
| 4,817,034 | 3/1989 | Hardin, Sr. et al. | 382/13 |
| 4,953,226 | 8/1990 | Matsuyama | 382/13 |
| 4,972,496 | 11/1990 | Sklarew | 382/187 |

(List continued on next page.)

FOREIGN PATENT DOCUMENTS 0 394 614 A2  10/1990  European Pat. Off. .

OTHER PUBLICATIONS

Go Corporation, Using Penpoint (Developer Release Beta Edition), Jan. 1991, pp. 35–64.

"Human Aspects in Computing: Design and Use of Interactive Systems and Work with Terminals", *Proceedings of the Fourth International Conference on Human–Computer Interaction*, vol. 1, Stuttgart, F.R. Germany, Sep. 1–6, 1991, pp. 716–721.

*Primary Examiner*—John E Breene
*Attorney, Agent, or Firm*—Sterne, Kessler, Goldstein & Fox P.L.L.C.

[57] ABSTRACT

An apparatus and method in a tablet computer for disambiguating a handwriting input stream generated by a stylus-based user interface. A tablet application program interface (TAPI) of the present invention receives stroke data generated by a stroke made by a user on a digitizing tablet. The TAPI inserts the stroke data into a database. If the stroke is an editing gesture, the TAPI routes the stroke to a gesture recognizer which identifies an editing dialog. The TAPI then executes the dialog to perform operations on the database. If the application program is expecting text input, the TAPI continues to receive stroke data until it detects a closure event. The TAPI then forms a stroke group entry in the database by grouping all non-gesture stroke data received since the last closure event. The TAPI routes the stroke group data to a character recognizer, which returns candidate characters. The TAPI inserts the candidate characters into the stroke group entry. The TAPI notifies the application program each time it updates the database.

17 Claims, 15 Drawing Sheets

U.S. PATENT DOCUMENTS

| | | | |
|---|---|---|---|
| 5,001,765 | 3/1991 | Jeanty | 382/187 |
| 5,029,223 | 7/1991 | Fujisaki | 382/13 |
| 5,038,382 | 8/1991 | Lipscomb | 382/189 |
| 5,148,155 | 9/1992 | Martin et al. | 345/173 |
| 5,231,698 | 7/1993 | Forlier | 395/155 |
| 5,309,555 | 5/1994 | Akins et al. | 395/157 |
| 5,319,721 | 6/1994 | Chefalas et al. | 382/160 |
| 5,367,453 | 11/1994 | Capps et al. | 395/155 |
| 5,390,260 | 2/1995 | Bezek | 382/187 |
| 5,404,458 | 4/1995 | Zetts | 345/173 |
| 5,455,901 | 10/1995 | Friend et al. | 382/187 |
| 5,467,407 | 11/1995 | Guberman et al. | 382/186 |
| 5,481,625 | 1/1996 | Suzuki | 392/187 |
| 5,533,141 | 7/1996 | Futatsugi et al. | 382/119 |
| 5,544,257 | 8/1996 | Bellegarda et al. | 382/187 |
| 5,550,930 | 8/1996 | Berman et al. | 382/187 |
| 5,559,897 | 9/1996 | Brown et al. | 382/187 |
| 5,564,112 | 10/1996 | Hayes et al. | 395/326 |
| 5,566,248 | 10/1996 | Ulrich | 382/187 |
| 5,570,113 | 10/1996 | Zetts | 345/179 |
| 5,583,761 | 12/1996 | Chou | 395/326 |
| 5,594,810 | 1/1997 | Gourdol | 382/187 |
| 5,613,019 | 3/1997 | Altman et al. | 395/326 |

DISAMBIGUATING INPUT STROKES OF A STYLUS-BASED INPUT DEVICES FOR GESTURE OR CHARACTER RECOGNITION

This application is a continuation, of application Ser. No. 07/869,593, filed Apr. 15, 1992.

DESCRIPTION

1. Technical Field

The present invention relates generally to a method and apparatus for entering data into a computer system. More particularly, the present invention relates to a method and apparatus for entering data into a computer system through a stylus-based user interface.

2. Background Art

Computer systems which accept data streams generated by operating a stylus are becoming commonplace. A stylus based user interface generally comprises a pen (called a stylus) and a digitizing tablet. The use of stylus-based user interfaces is being driven by the general trend toward more natural user interfaces utilizing handwriting and freehand drawing.

In many application programs, stylus-based user interfaces are superior to keyboards as a means for entering data. Such is the case, for instance, when a user of the computer has only one hand available for data entry. Other cases include, but are not limited to, those in which a keyboard would add too much bulk or weight to a data processing system designed to be highly portable or the case of a system designed for operation by a user who does not know how to or is physically unable to type.

The difficulty in producing computer systems with stylus-based user interfaces has limited their marketability. Compared to an input data stream from a keyboard or mouse, an input stream from a stylus-based user interface is more difficult for the system to interpret and makes the development of stylus-based application programs very complex. The input stream of a keyboard or mouse (generally) unambiguously reflects a user's intention, that is, to select a particular keyboard key or mouse button. The application program may or may not be able to respond meaningfully to that particular input data, but the input data itself is clear.

The stylus-based user interface, on the other hand, functions as a source of both character data (such as text, function keys and editing commands) and gesture data (i.e., mouse data such as pointing and selecting). Regardless of which of these two types of data the user intends to enter, the input data stream of the stylus-based user interface consists of a series of x-y coordinate pairs (called x-y data) which describe the locus of the stylus as the user operates it. Stroke data are generated from the x-y data. Stroke data represent strokes, which are sequences of the x-y coordinate pairs delimited by a pen-down event and a pen-up event. A pen-down event occurs when the stylus first touches the digitizing pad. A pen-up event occurs when the stylus next leaves the digitizing pad.

Some application programs, such as a sketching application or a signature capture application program, need to deal directly with these strokes. Most application programs, however, need only deal with the character data represented by the strokes. Accordingly, stroke data must be interpreted before an application program can process it. The interpretation may involve classifying the stroke data as gesture or character data, and/or converting them to character data. Accordingly, interpreting stroke data is a complex process which generally requires much programmer time to implement and much CPU to run.

Several conventional approaches are employed to interpret stroke data. In a first such approach, the application program interprets the stroke data. The application program receives stroke data, classifies them, and performs any necessary conversion to character data. A disadvantage of the first approach is that it requires the application programmer to extend considerable effort to learn about stroke-to-keyboard data conversion and to write source code to implement the same. Furthermore, application programs generally have very specific ways of handling stroke data. As a result, little of the conversion source code can be reused in other applications.

In a second approach, an operating system interprets the stroke data and passes the results to the application program. The Go Pen-point is an example of a computer system which employs the second approach. A major drawback of the second approach is that it is only feasible for operating systems designed to process stroke data. Accordingly, it cannot be used on such widely used operating systems such as DOS, Unix and OS/2.

Therefore, what is needed is a system for disambiguating an input stream from a stylus-based user interface which can be used by multiple application programs on existing, widely used operating systems.

DISCLOSURE OF INVENTION

Accordingly, the present invention is directed toward an apparatus and method in a tablet computer for disambiguating a handwriting input stream generated by a stylus-based user interface. A tablet application program interface (TAPI) of the present invention receives stroke data generated by a stroke made by a user on a digitizing tablet. The TAPI inserts the stroke data into a database, and informs the application program to which the stroke was directed that the database has been updated. The application program may then retrieve the stroke data from the database.

If the stroke is an editing gesture, the TAPI routes the stroke to a gesture recognizer which matches the stroke data to a gesture prototype stroke. The gesture recognizer identifies an editing dialog associated with the prototype gesture stroke. The TAPI then executes the dialog to perform operations on the database, and notifies the application program that the database has been updated. The TAPI may also cause a display on a display device of the tablet computer to be redrawn to reflect the updated database.

If the application program is expecting text input, the TAPI continues to receive stroke data until it detects a closure event delimiting a group of strokes. At that time, the TAPI forms a stroke group entry in the database by grouping all non-gesture stroke data received since the last closure event. The TAPI routes the stroke group data to a character recognizer which matches it to a number of character prototype strokes.

The character recognizer then generates result data comprising the characters to which the character prototype strokes are mapped and an indication of the quality of each match. The TAPI inserts the result data into the stroke group entry and notifies the application program that the database has been updated. The TAPI may also cause the display on the display device to be redrawn to reflect the updated database.

The foregoing and other objects, features and advantages of the invention will be apparent from the following more particular description of preferred embodiments of the invention, as illustrated in the accompanying drawings.

BEST MODES FOR CARRYING OUTS THE INVENTION

Hardware and Software Environment

Figure 1:
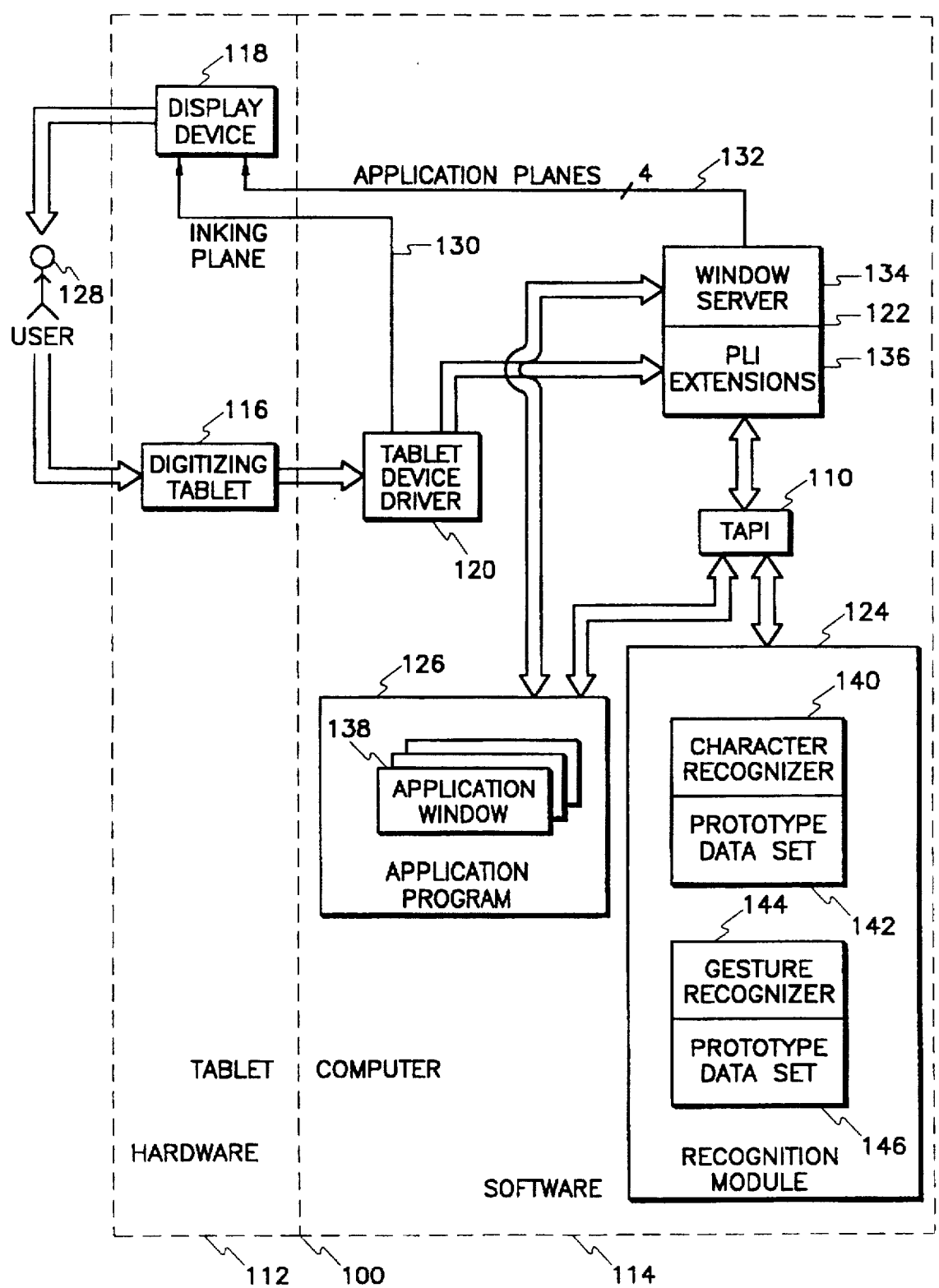
FIG. 1 is a block diagram of the hardware and software environment of the present invention.

FIG. 1 is a block diagram of a tablet computer 100 which uses a tablet application program interface (TAPI) 110 of the present invention. The tablet computer 100 comprises a hardware subsystem 112 and a software subsystem 114. The hardware subsystem 112 comprises a digitizing tablet 116 and a display device 118. The software environment 114 comprises the TAPI 110, a tablet device driver 120, a window system 122, a recognizer module 124 (in some implementations), an application program 126, and at least one application window 138. The window system 122 comprises an window server 134 and PLI extensions 136. The recognizer module 124 comprises a character recognizer 140, character prototype data 142, and possibly a gesture recognizer 144 and gesture prototype data 146.

A user 128 enters data into the tablet computer 100 by operating a stylus on the digitizing tablet 116. The digitizing tablet 116 generates x-y data representative of strokes made with the stylus.

The tablet device driver 120 handles communications between the digitizing tablet 116 and the software subsystem 114. For example, the tablet device driver 120 initializes the digitizing tablet 116, maintains a command dialog between the tablet device driver 120 and an operating system, captures the x-y data from the digitizing tablet 116, transmits the x-y data (via the operating system) to the window system 122, and inks an inking plane 130 of the display device 118. (Note that the inking of the inking plane 130 could instead be performed by a hardware interface of the digitizing tablet 116.)

The display device 118 receives data from the tablet device driver 120 (via its inking plane 130) and the window system 122 (via one or more application planes 132). The separate inking and application planes 130 and 132 facilitate distinguishing between display data from the digitizing tablet 116 and display data from the window system 122. The distinction enables the tablet device driver 120 to immediately ink stroke data. The stroke data can later be erased without affecting data written by the window system 122. Alternatively, the window system 122 can make the displayed stroke data permanent by copying it to the application bit planes 132. In a preferred embodiment, the display device 118 is a conventional VGA display with four application planes 132 and a single inking plane 130.

Functions of the window system 122 include accepting input data from the operating system, managing input event queues and routing input events to the appropriate application window 138. The window system 122 could be a conventional window system such as the X Window System™, plus extensions to support stroke data. The X Window System is available from the Massachusetts Institute of Technology. The extensions could be the Paper-Like Interface (PLI) extensions 136 to the X Window System, which were developed by the International Business Machines Corporation. These extensions are distributed as part of release 5 of version X 11 of the X Window System. The PLI extensions 136 comprise modifications to a window server 134 (such as that of the X Window System) to enable it to support additional event queues (including a stroke event queue) and to handle stroke data.

Upon initialization of the application program 126, each application window 138 associated with it registers with the window system 122 and can request to be notified of stroke events. Depending on the routing algorithm used by the window server 134, when a stroke event occurs, it may be presented to application windows 138 which include its x-y coordinates, to all of the application windows 138, or according to other policies. Upon accepting the stroke event, the application window 138 also requests the actual stroke data. The stroke data are not used directly in the notification because, in general, the x-y data associated with each stroke are larger than the message size of the window system 122. After retrieving the stroke data, the application window 138 notifies the window system 122 to delete the stroke data from its cache, and it notifies the tablet device driver 120 to erase the stroke from the inking plane 130.

Depending on its nature, the application program 126 may write the stroke data to the application planes 132. It may also pass the stroke data to the character recognizer 140 for conversion into an ASCII code (for handwriting input) or to the gesture recognizer 144 for conversion into a function code (for a gesture). Recognizers perform recognition by comparing strokes to examples in prototype data sets. Accordingly, a character prototype data set 142 contains a collection of hand written examples of each valid character and a gesture prototype data set 146 contains a collection of handwritten examples of each valid gesture.

Overview of TAPI

The TAPI 110 comprises a set of modules and data structures for the management of stroke data. The TAPI is architected as a programming interface and a set of data structures. In a preferred embodiment, the window system 122 provides the user-interface framework for the application program 126.

The application program 126 can configure the TAPI 110 to operate in many different ways. For example, in a first configuration, the TAPI 110 simply captures and displays strokes, with any other processing being performed by the application program 126 itself. Such a configuration might be employed, for example by an application program 126 for sketching or drawing or by an application program 126 for signature capture.

In a second configuration, the TAPI 110 captures and displays strokes and performs handwriting recognition in a writing window which pops up on the display device 118 when the stylus first touches the writing window.

In a third configuration, the TAPI 110 captures and displays strokes and performs handwriting recognition in an unlined, scrolling window on the display device 118 with in-situ editing and error correction invoked by appropriate gestures on recognized text. The editing and error correction actions are determined by dialog procedures which use database primitives 614 (see FIG. 6) of the database 212 to manipulate the stroke and character data in the database 212.

Figure 2:
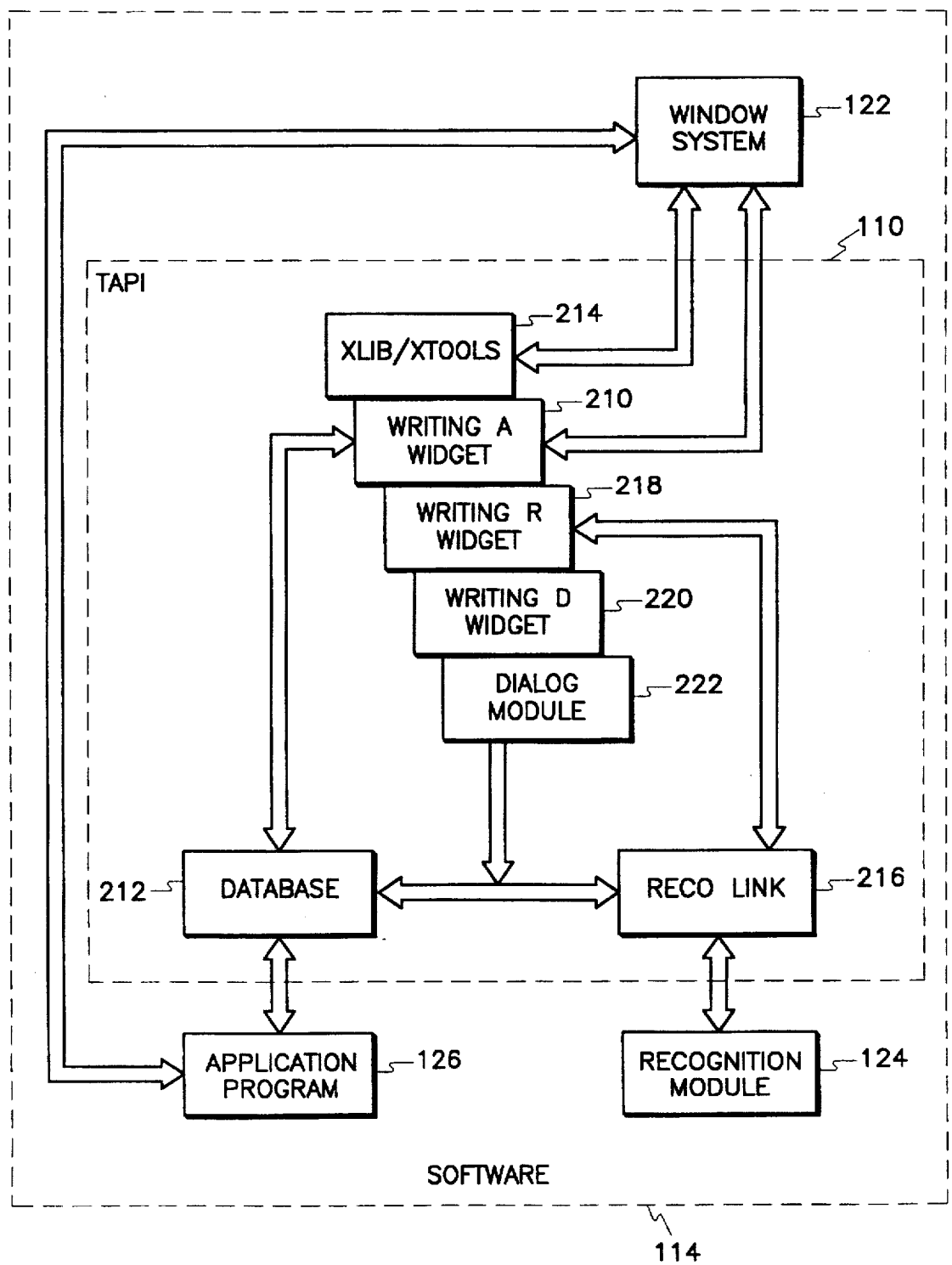
FIG. 2 is a block diagram of the TAPI of FIG. 1.

FIG. 2 is a high level block diagram of the structure of a preferred embodiment of the TAPI 110 of the present invention. In this embodiment, the TAPI 110 comprises an Xlib/Xtools widget set 214, a writingA widget 210, a writingR widget 218, a writingD widget 220, a dialog module 222, a database 212, and a reco link 216. FIG. 2 also shows how the TAPI 110 interacts with the application program 126 and recognizer 124 of FIG. 1.

A specific instance of the writing widgets 210, 218 and 220 would generally be associated with each application window 138. Also, to facilitate portability, the writingA widget 210 contains all of the features of the TAPI 110 which are specific to any particular window system and widget set.

A widget is a re-usable object which manages an application window 138 presented on the display device 118. It provides a path between user input events and the input mechanisms of the application program 126 that respond to these events. It also provides a path between the output mechanisms of the application program 126 and a window manager of the display device 118. A widget may also provide specialized services to transform or otherwise respond to input or output events.

Several standard widget sets have been developed, including the Xlib/Xtools widget set 214, the Open Software Foundation's Motif widget set and Carnegie Mellon University's Andrew widget set. The user-interface portions of application program 126 written for X Windows environments are generally constructed from a standard widget set and additional widgets to perform specialized functions. The additional widgets are written by the developer of the application program 126 but descend from (i.e., inherit attributes from) widgets in the standard widget set. The additional widgets in the present invention are the writingA widget 210, the writingR widget 218 and the writingD widget 220.

The writingA widget 210 descends from the Motif drawingArea widget. In addition to handling x-y data (as the drawingArea widget does) the writingA widget 210 provides an interface to the database 212. It also keeps track of strokes that occur between closure events, thereby facilitating character recognition.

The writingR widget 218 serves as an interface to the reco link, performs simple operations on the database 212 and supports character display. The writingD widget 220 serves as an interface to the dialog module 222. Additional functions of the writing widgets 210, 218 and 220 are described below in the section entitled "Operation of the TAPI".

The dialog module 222 supports a set of database operations invoked by gestures made by the user 128. The database 212 comprises structures for storing stroke data and recognition data, as well as primitives for modifying the data, writing the data to a file and reading the data from a file. The reco link 216 provides a configuration interface to the character recognizer 140 and the gesture recognizer 144.

Database

Figure 6:
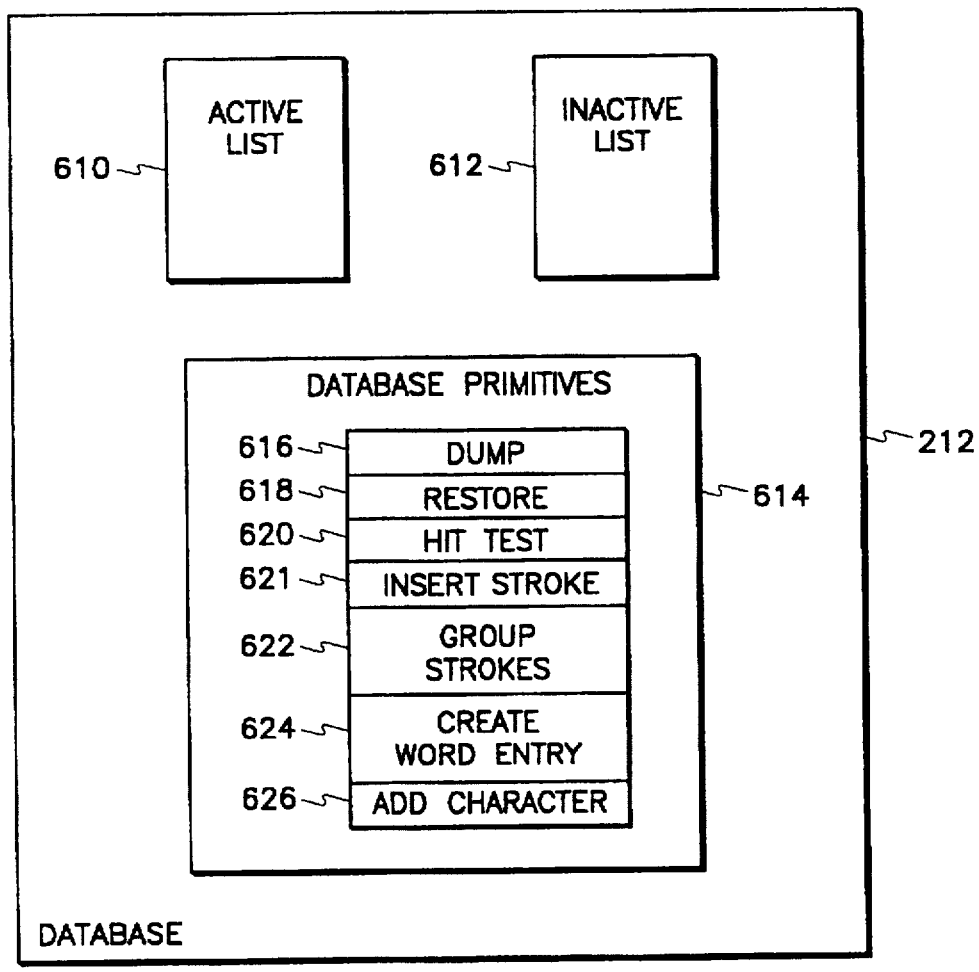
FIG. 6 is a block diagram of a database of FIG. 2.

FIG. 6 shows a block diagram of the structure of the database 212. Looking at FIG. 6, the database 212 comprises an active list 610, an inactive list 612 and database primitives 614. The database primitives 614 include a dump primitive 616, a restore primitive 618, a hit test primitive an inset stroke primitive 621, a group strokes primitive 622, a create word entry primitive 624 and an add character primitive 626, as well as many others. The active list 610 contains data the user 128 has entered and not deleted, while the inactive list 612 contains data the user 128 has entered and subsequently deleted.

Figure 7A:
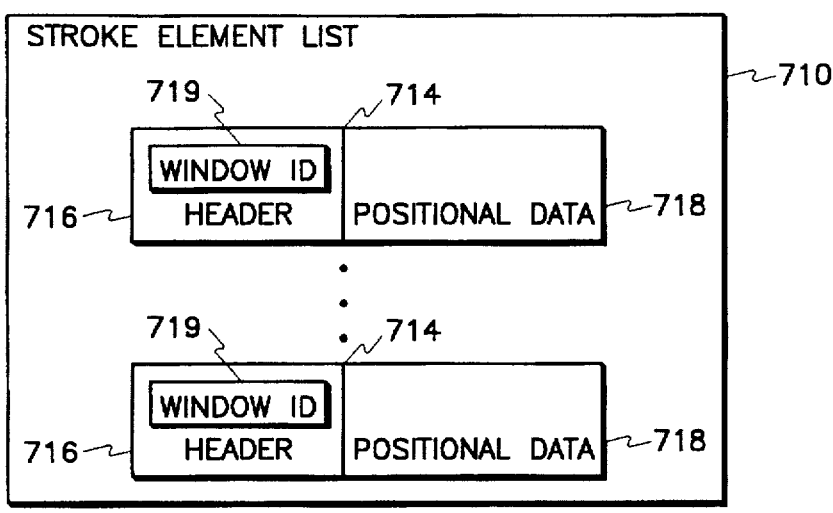
FIGS. 7A, 7B and 7C are block diagrams of structures of an active list of FIG. 6.
Figure 7B:
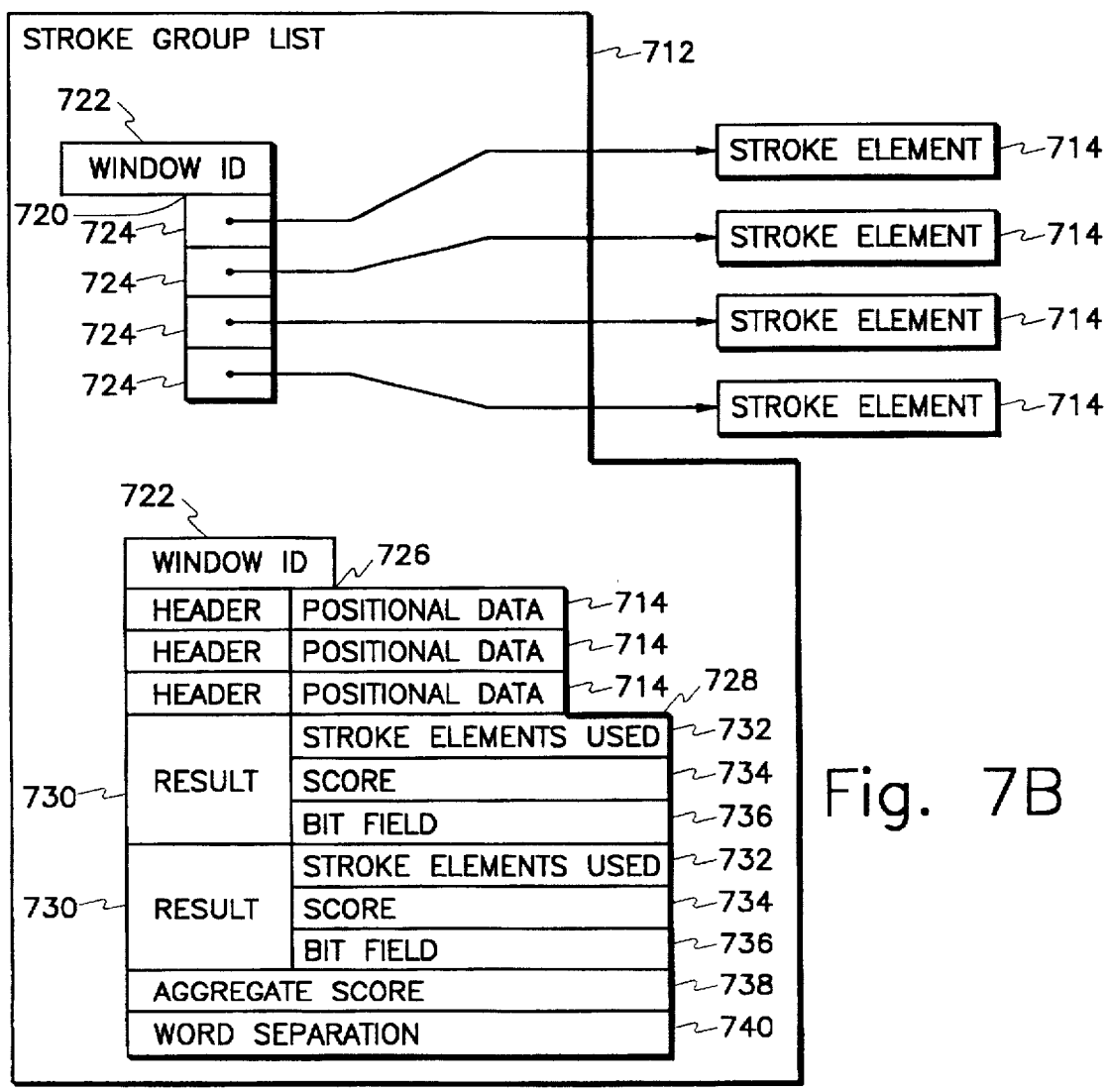
Figure 7C:
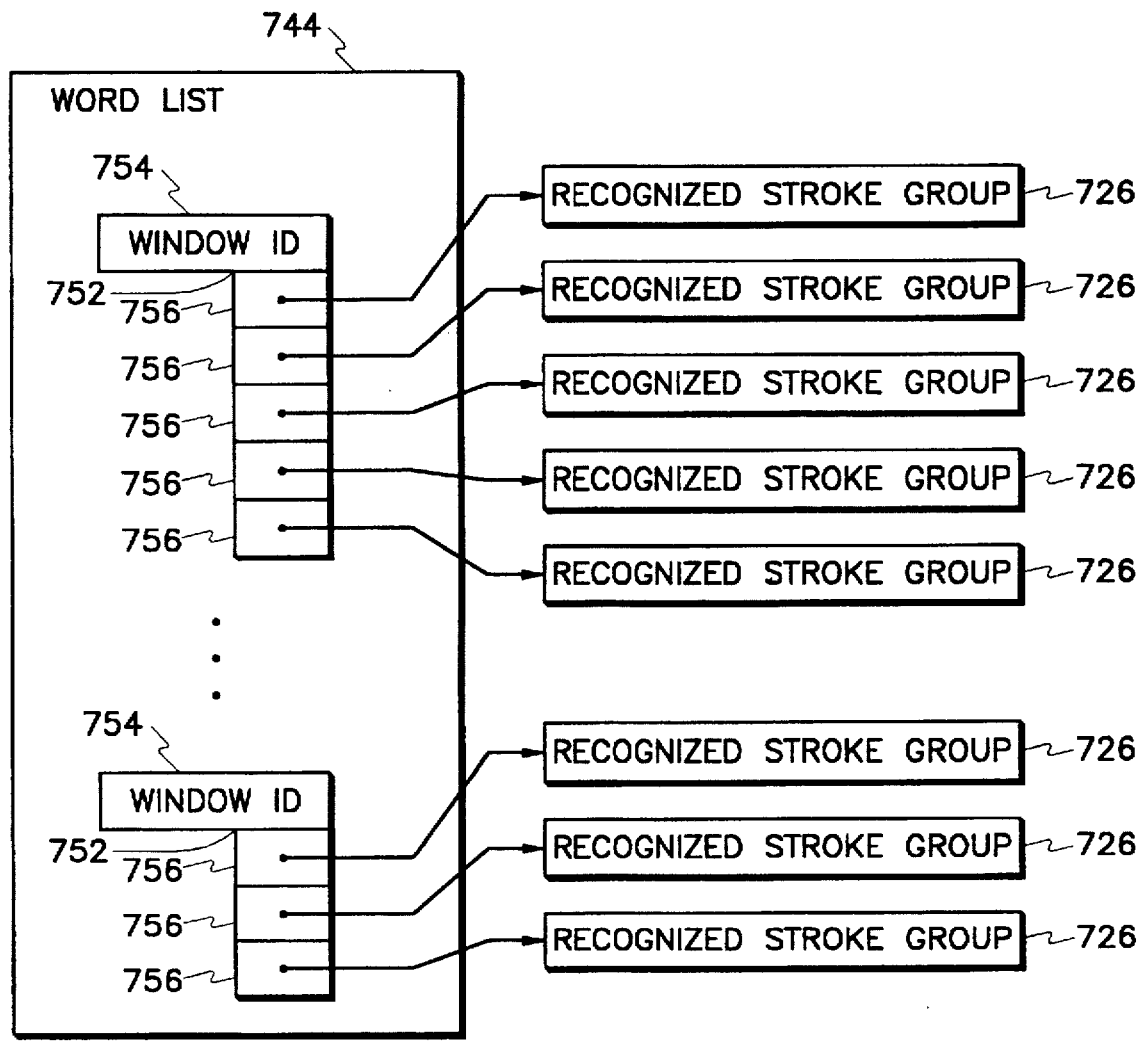

FIGS. 7A, 7B, and 7C show the structure of the active list 610. The structure of the active list 610 is the same as that of the inactive list 612. Accordingly, FIGS. 7A, 7B and 7C also illustrate the structure of the inactive list 612. Looking at FIG. 7A, the active list 610 comprises a stroke element list 710 (see FIG. 7A), a stroke group list 712 (see FIG. 7B), and a word list 744 (see FIG. 7C). Each stroke element entry 714 in the stroke element list 710 comprises a header 716 and positional data 718. The header 716 contains a window id 719 as well as other data such as the time at which a stroke was made. The window id 719 indicates the application window 138 in which the stroke was made. The positional data 718 contains the stroke's relative coordinates on the display device 118.

The stroke group list 712 can have two kinds of entries. First, an unrecognized stroke group entry 720 comprises a window id 722 and stroke element pointers 724. Each of the stroke element pointers 724 points to a stroke element entry 714 associated with strokes which have been grouped together, in the manner explained below in the section entitled "Operation of the TAPI".

Second, a recognized stroke group entry 726 comprises the window id 722, at least one stroke element entry 714 and a result structure 728. The result structure 728 comprises at least one result 730 and, with each result 730, a stroke elements used field 732, a score field 734 and a bit field 736. The stroke elements used field 732 indicates all of the stroke elements used by the recognizer 124 in determining the result 730. The score field 734 indicates the certainty with which the recognizer 124 determined the result 730. The bit field 736 indicates other information about the result 730, such as whether or not it should be displayed and whether or not it is an active result. The active result is initially the result 730 with the lowest score field 734 (and thus the greatest certainty).

The result structure 728 further comprises an aggregate score 738 and a word separation field 740. The aggregate score 738 indicates an estimation by the recognition module 124 of the probability that the result structure 728 contains a correct result. The word separation field 740 indicates whether or not the distance between the strokes used in generating the result structure 728 and those used in generating the preceding adjacent result structure 728 exceed a predetermined threshold.

Looking at FIG. 7C, the word list 744 contains a number of word list entries 752. A word list entry represents a group of characters, i.e., a word. Specifically, the word list structure 752 has a window ID 754 and a number of character pointers 756. Each character pointer 756 points to one of the recognized stroke group entries 726.

Operation of TAPI

Initial Processing of Stroke Data

FIGS. 3A through 3E show a flowchart of the operation of the third embodiment of the invention. Looking at FIG. 3A, in the step 310 the Xlib/Xtools widget set 214 configures the logical display of each application window 138. Application window configuration involves specifying the position, shape and its type font of the window, the type of data it accepts (e.g., text, strokes or some combination of the two), and several other parameters.

In a step 312, the tablet device driver 120 captures x-y data from the digitizing tablet 116. In the step 314, the tablet device driver 120 displays the x-y data by inking the inking plane 130 of the display device 118.

In the step 316, the tablet device driver 120 generates from the x-y data stroke events and stroke element entries 714. Generation of a stroke event involves generating a pen-down, pen-up or intermediate stroke event. The tablet device driver 120 generates a pen-down stroke event upon receiving a code from the digitizing tablet 116 which indicates that the user 128 has placed the stylus on the digitizing tablet 116. Similarly, the tablet device driver 120 generates a pen-up event upon receiving a code from the digitizing tablet 116 which indicates that the user 128 has lifted the stylus from the digitizing tablet 116. The tablet device driver 120 generates intermediate stroke events at regular intervals to indicate the location of the stylus. For example, it could generate an intermediate event for every one hundred x-y coordinates received. The intermediate stroke events enable the TAPI 110 or the application program 126 to determine when the user 128 has finished moving the stylus and is just holding it steady on the digitizing tablet 116.

Generation of the stroke element entry 714 is as follows. The tablet device driver 120 converts x-y coordinates generated between a pen-down and pen-up event to relative coordinates of the display device 118, and inserts the latter coordinates into the field for positional data 718 in the stroke element entry 714. The tablet device driver 120 then inserts additional information regarding the stroke (including the window id 719) into the header 716 of the stroke element entry 714.

In a step 318 the tablet device driver 120 routes each stroke element entry 714 to the application window 138 through the window system 122. Specifically, the tablet device driver 120 sends the stroke element entry 714 and the stroke events to the window system 122. The stroke element entry 714 is added to a stroke data cache of the PLI extension 136, and the stroke events are placed on a stroke event queue of the PLI extension 136. The window system 122 then routes the stroke events to the application windows 138.

Various policies may be used to determine which of the application windows 138 will be offered a stroke event.

For example, the stroke event might be offered initially to the application window 138 it accepted the previous stroke event. Or the stroke event might be offered to the application window 138 only if the associated stroke was made through it. Or the stroke event might be offered to the application window 138 only if the application window 138 is exposed. If the application window 138 was offered the stroke event, it responds to the window system 122 by indicating whether or not it will accept the stroke element entry 714 associated with the stroke event. Generally, the application window 138 will only be able to accept the stroke events if application window 138 was built with the TAPI 110 widgets 210, 218 and 220.

In a step 320, the window system 122 determines whether the application window 138 has accepted the stroke event. If not, then the steps 322–328 are carried out as follows. In a step 322, the window system 122 converts the stroke event to a mouse event. In a step 324, the tablet device driver 120 erases the x-y data in the inking plane 130. In a step 326, the window system 122 routes the mouse event to the application window 138. Specifically, the mouse event is put on a mouse event queue of the window server 134. The window server 134 then routes the mouse event to the application window 138. In a step 328, the application program 126 associated with the application window 138 which accepted the mouse event processes the mouse data. Flow of control of the TAPI 110 then returns to the step 312.

If, on the other hand, the application window 138 did accept the stroke element entry 714, then the operation of the TAPI 110 is as follows. In a step 330, the writingA widget 210 requests the stroke element entry 714 from the stroke data cache of the PLI extension 136 and transmits it to the database 212. When it does so, the widgetA inserts an identifier of the application window 138 (the window id 719) into the header 714. In a step 332, the insert stroke primitive 621 of FIG. 6 creates a new entry in the stroke element list 710 of the database 212 and copies the stroke element entry 714 to it.

The writingA widget 210 then transmits an appropriate message through the window system 122 to the tablet device driver 120. The tablet device driver 120 responds, in a step 334, by erasing the x-y data of the stroke from the inking plane 130.

Figure 3A:
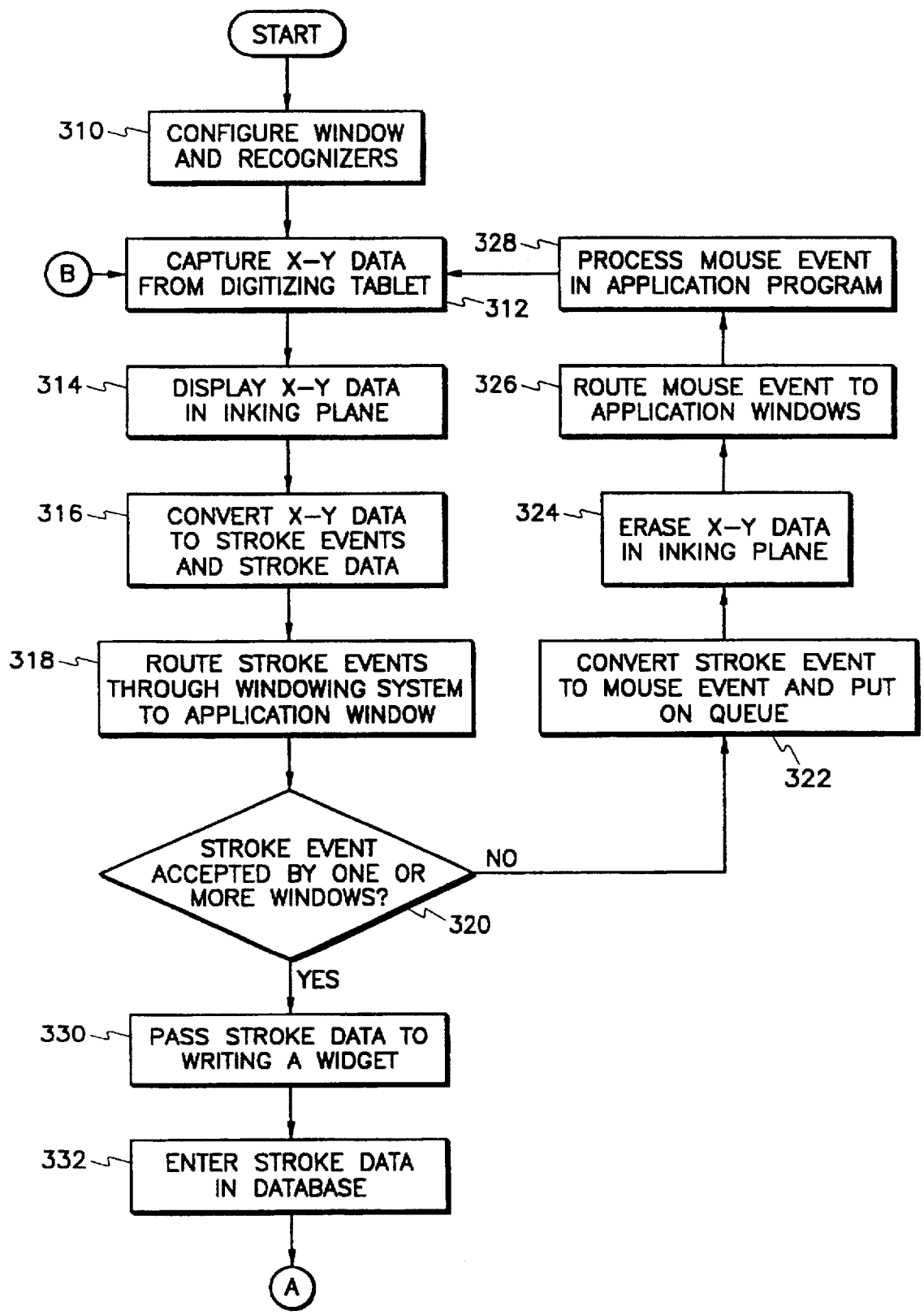
FIGS. 3A–3E are a flowchart of the operation of the present invention.
Figure 3B:
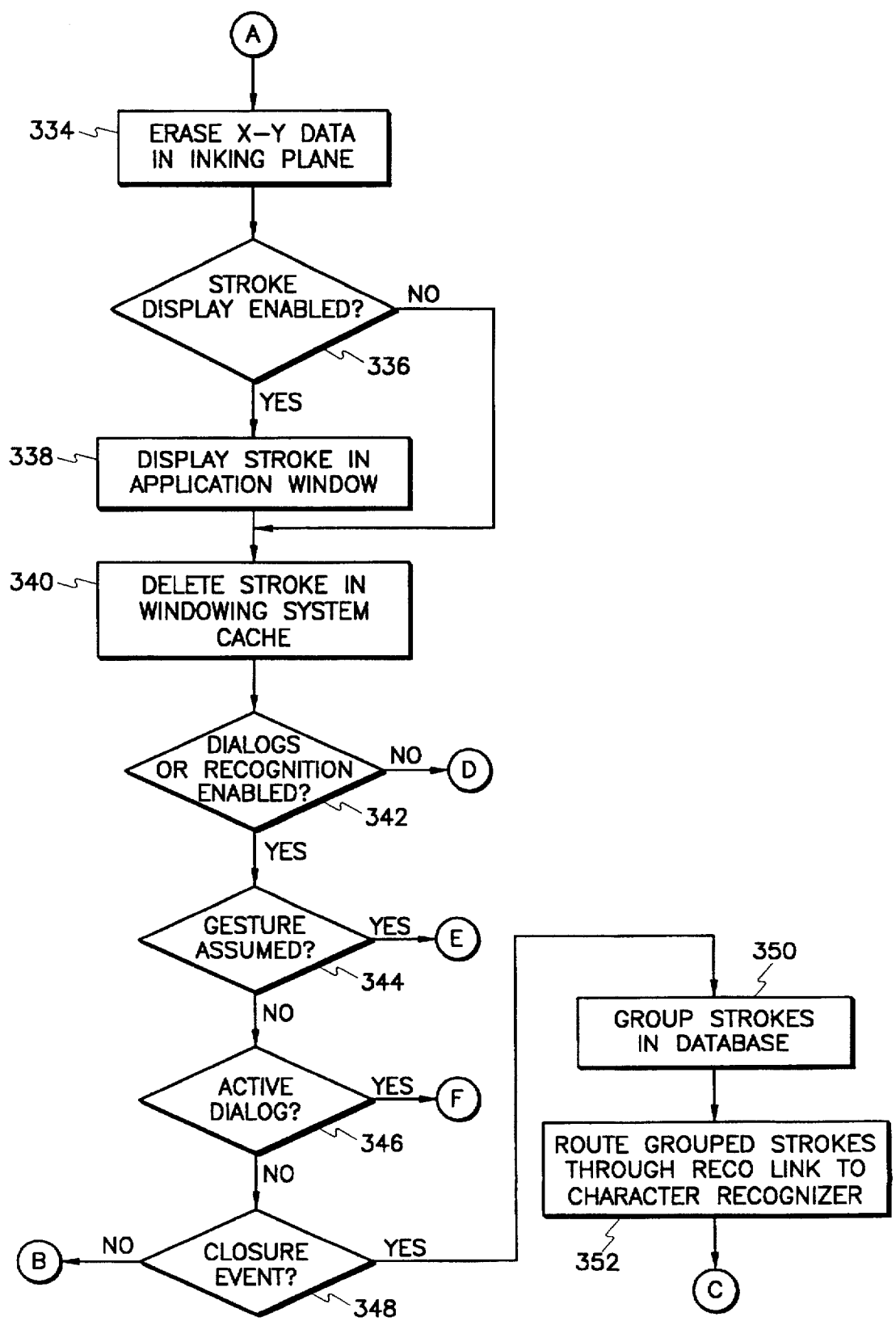
Figure 3C:
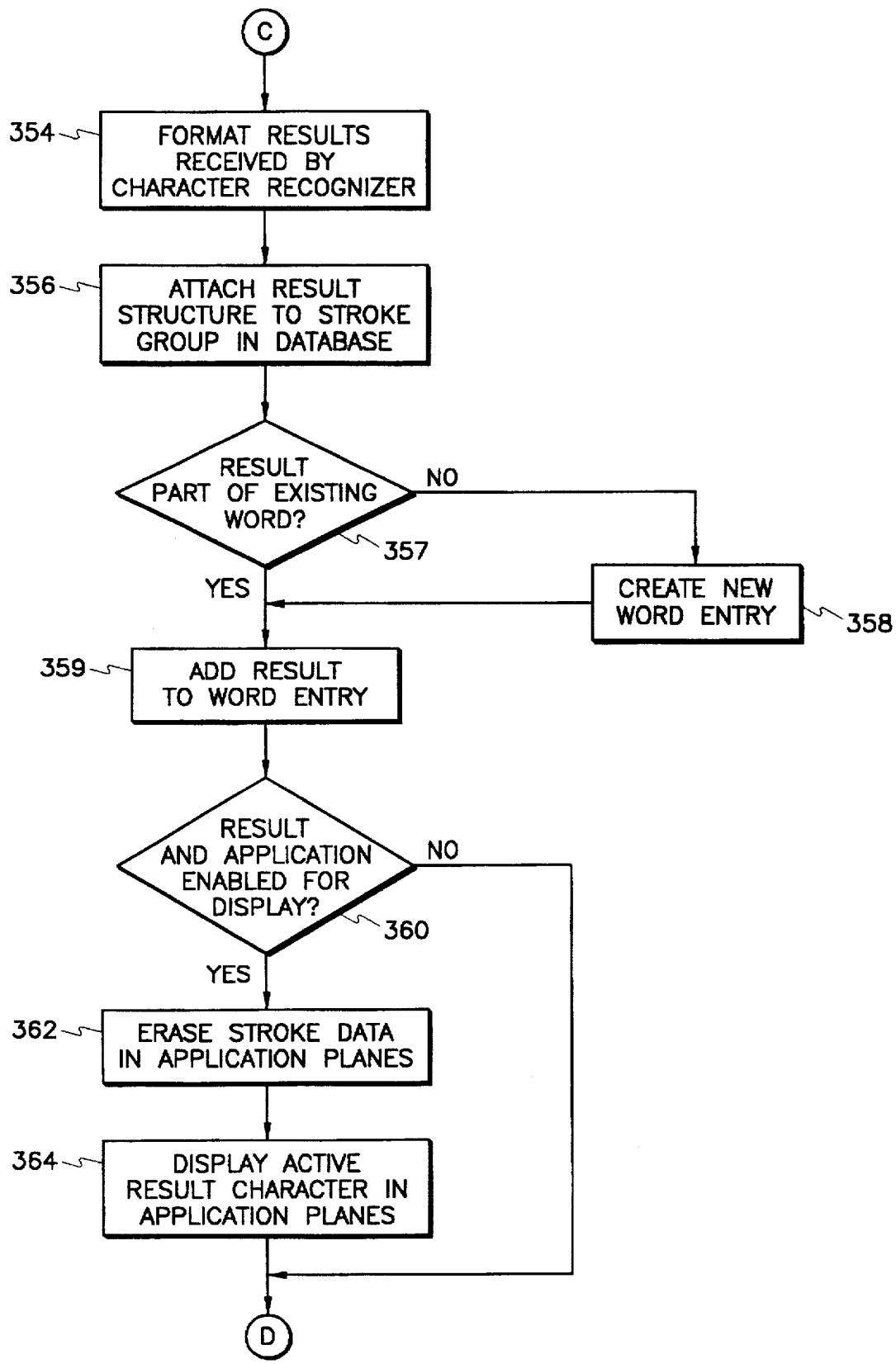
Figure 3D:
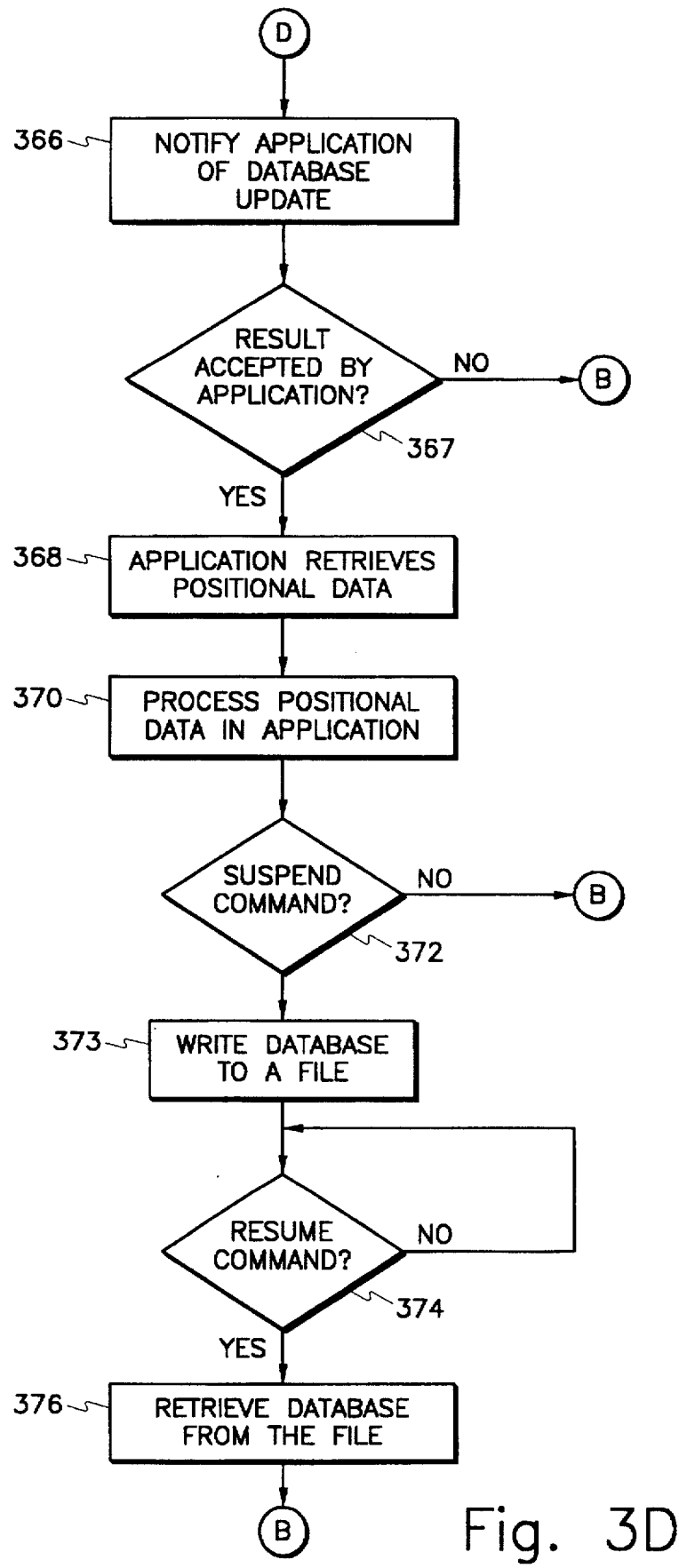
Figure 3E:
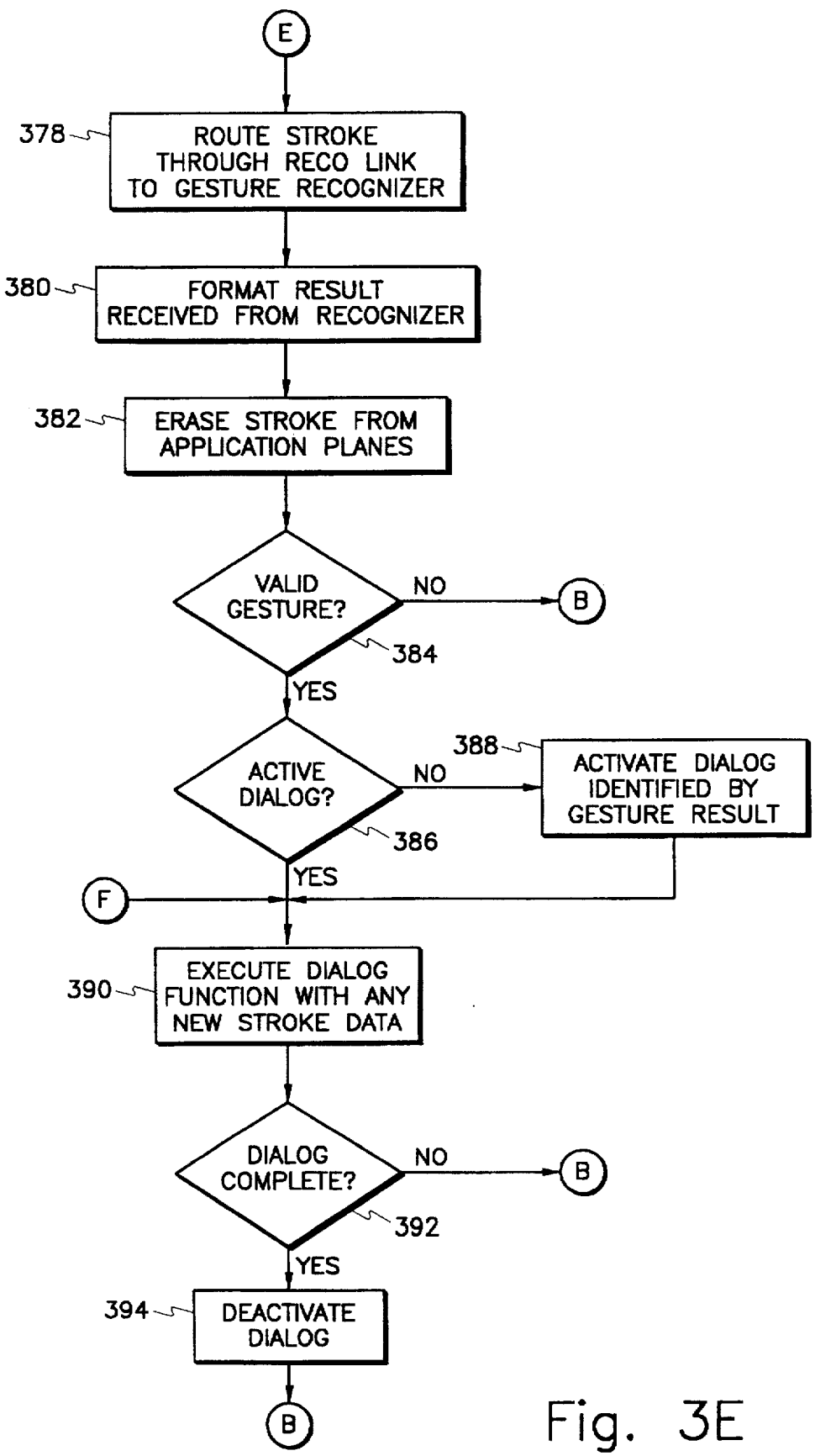

Looking at FIG. 3B, in a step 336 the writingA widget 210 determines whether stroke display is enabled for the application window 138 by consulting configuration parameters of the application window 138. If stroke display was enabled, then in a step 338 the writingA widget 210 inks the positional data 718 in the application planes 132 so that the stroke is displayed in the application window 138. Otherwise, or after the step 338, in step 340 the writingA widget 210 commands the window system 122 to delete the stroke element entry 714 from the stroke data cache of the PLI extension 136.

In a step 342, the writingR widget 218 and the writingD widget 220 determine whether the dialog module 222 or the recognizer module 124 is enabled for the application window 138. If not, then execution transfers immediately to a step 366 of FIG. 3D, in which the writingA widget 210 notifies the application window 138 that there is a new stroke element entry 714 in the stroke element list 710. If the application window 138 does not accept the entry, then flow of control returns to the step 312 to capture additional stroke data (see step 367). Otherwise, the application program 126 processes the stroke element entry 714 as follows.

Processing of Stroke Data by Application Program

In a step 368, the application program 126 may retrieve the positional data 718 from the stroke element entry 714. The application program 126 then processes the positional data 718, as indicated by a step 370. In a step 372, the application program 126 determines whether a request has been issued for it to suspend execution. If not, execution returns to the step 312 to capture additional stroke data.

Otherwise, in a step 373 the application program 126 saves the state of the database 212. It does so by invoking the dump primitive 616 of FIG. 6 to write the data contained in the database 212 to a database file. The application program 126 then enters a suspended mode in a step 374, in which it continually tests to see if it has been commanded to resume. Upon receipt of the resume command, the application program 126 restores the state of the database 212 in a step 376. It does so by invoking the restore primitive 618 to retrieve the data of the database 212 from the database file. Execution then returns to the step 312.

Processing a Gesture

If on the other hand, the dialog module 222 or the recognizer 124 was found to be enabled in the step 342, execution continues as follows. In a step 344 FIG. 3B the writingR widget 218 determines whether to assume the stroke is a gesture. It could do so by, for example, assuming that the stroke is a gesture if an imaginary box drawn around the stroke would exceed a specified size.

If the stroke is assumed to be a gesture, then execution is as follows. In a step 378 of FIG. 3E, the writingR widget 218 routes the stroke through the reco link 216 to the gesture recognizer 144. Specifically, the writingR widget 218 routes to the reco link 216 a pointer to the associated stroke element entry 714. The reco link 216 responds by routing to the gesture recognizer 144 the stroke element pointer as well as a pointer to an anchor point in a heap. (A heap is a continuous portion in the memory of the tablet computer 100.)

The gesture recognizer 144 then performs a recognition algorithm by comparing the stroke to the sample gestures in the gesture prototype data set 146. The gesture recognizer 144 either indicates in the heap a dialog identification code associated with the matching sample or (if it found no match) terminates with an error code. Upon completion, it notifies the reco link 216.

In a step 380, the reco link 216 performs any necessary formatting of the data in the heap to make the result comprehensible to the writingD widget 220. Whether or how the data must be formatted depends on the nature of the gesture recognizer 144.

In a step 382, the gesture stroke is erased from the application window 138. In a step 384, the TAPI 110 determines whether the gesture recognizer 144 terminated with an error code. If so, the assumption in the step 344 was incorrect. The stroke was likely part of a character. Accordingly, execution returns to the step 312 to capture additional x-y data.

If, on the other hand, the result returned by the gesture recognizer 144 did indicate a valid gesture, then in a step 386 the writingD widget 220 determines whether on e of the dialogs is already active. If none is active, then the gesture must indicate the desire of the user 128 to start one of the dialogs in the dialog module 222. Accordingly, in a step 388, the writingD widget 220 activates the dialog indicated by the dialog identification code result.

If there was an active dialog when the step 386 was executed, or after activation of the dialog in the step 388, then in a step 390 the active dialog executes any stroke data received since it last executed. Dialog execution is described below in the section entitled "Dialogs".

In a step 392, the TAPI 110 determines whether the active dialog has completed execution. If so, in a step 394 the active dialog is deactivated. After the step 394 or a negative determination in the step 392, execution returns to the step 312 to capture additional stroke data.

If, on the other hand, the stroke was not assumed to be a gesture in the step 344, then in a step 346 the writingD widget 220 determines whether there is an active dialog. If so, then the stroke will be processed by the active dialog. Accordingly, execution transfers to the active dialog at the step 390 of FIG. 3E, which is explained above.

Response to a Closure Event

If in the step 346 there was no active dialog, then in a step 348 the writingR widget 218 tests for a closure event. A closure event delimits a complete handwritten symbol. It may be a hard event, such as the user 128 touching a button icon on the display device 118, or it may be soft event such as a timeout following the end of a stroke or a relatively large movement of the stylus between the end of one stroke and the beginning of the next. If there is no closure event, flow of control returns to the step 312 to collect additional stroke data. Otherwise, the operation of the TAPI 110 is as follows.

In a step 350, the writingR widget 218 commands the database 212 to form a group of all the non-gesture strokes received since the previous closure event. The group primitive 622 (see FIG. 6) of the database 212 responds by: (1) creating an unrecognized stroke group entry 720 on the active list 610 (see FIG. 7), (2) setting the stroke element pointers 724 to point to the appropriate stroke element entries 718, and (3) copying the window id 719 of the stroke element 714 to the window id 722 of the unrecognized stroke group entry 720.

In a step 352, the writingR widget 218 routes the stroke group through the reco link 216 to the character recognizer 140. Specifically, the writingR widget 218 routes to the reco link 216 a pointer to the unrecognized stroke group entry 720. The reco link 216 responds by routing to the character recognizer 140 the stroke group pointer as well as a pointer to an anchor point in a heap.

The character recognizer 140 then performs a recognition algorithm by comparing the stroke group to the sample stroke groups in the character prototype data set 142. The character recognizer 140 indicates in the heap a number of result characters associated with matching samples, as well as, for each result character, the strokes actually used in the prototype comparison, a score (i.e., the quality of the match) and other data. Upon completion, the character recognizer 140 notifies the reco link 216.

In a step 354, the reco link 216 performs any necessary formatting of the data in the heap to make the result comprehensible to the writingR widget 218. Whether or how the data must be formatted depends on the nature of the character recognizer 140.

In a step 356, the writingR widget 218 attaches a result structure 728 to the unrecognized stroke group entry 720, thereby converting the latter into a recognized stroke group entry 726. Specifically, the writingR widget invokes the database primitives 614 to copy the result data from the heap to the result structure 728. The writingR widget 218 then computes the value of the word separation field 740 and inserts this into the result structure 728. The word separation field 740 indicates whether or not the distance between the strokes used in generating this result structure 728 and those used in generating the preceding adjacent result structure 728 exceeds a predetermined threshold.

In a step 357, the writingR widget 218 determines whether the result just recognized should be grouped with an existing word list entry 752. That is, it determines whether the word separation field 740 indicates the threshold was exceeded. If so, then in a step 358, the writingR widget 218 commands the create word entry primitive 624 of the database 212 to create a new word structure 752 in the word list structure 744 (see FIG. 7C). Otherwise, or after the step 358, in a step 359 the writingR widget 218 commands the add character primitive 626 to add the result structure 726 to the current word structure 752.

In a step 360, the writingA widget 210 determines from the bit field 736 whether this result should be displayed and whether the application window 138 is enabled for display of the recognition result. If both conditions are met, then in a step 362 the writingA widget 214 erases the positional data 718 inked in the application planes 132 (in the step 338). In a step 364, the writingA widget 214 inks in the application planes 132 the active result 730 of the result structure 728 using the font defined by the configuration data of the application window 138.

After the step 364 or a negative determination in the step 360, execution goes to the steps 366–376, which are described above.

Dialogs

Figure 8:
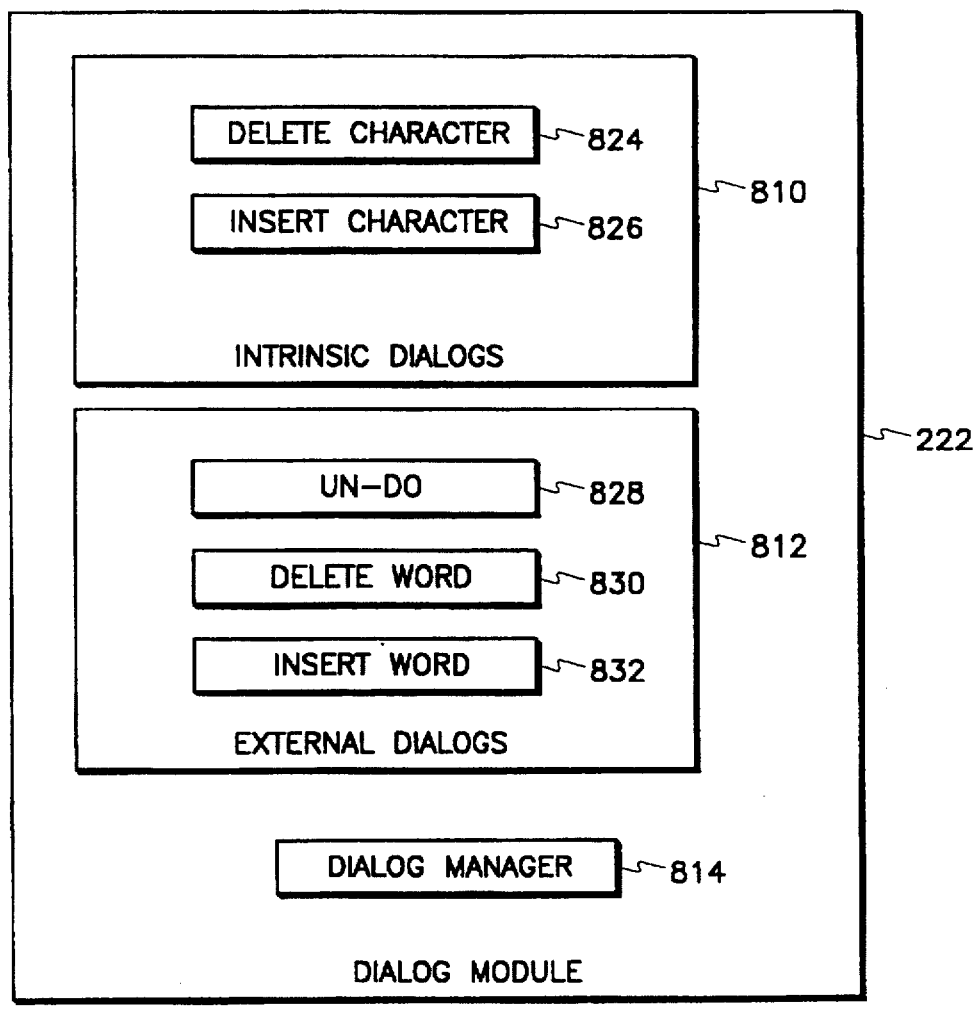
FIG. 8 is a block diagram of a dialog module of FIG. 2.

Dialogs are incorporated within the writingD widget 220, but are implemented in a rule-based language so as to enable developers of application programs to easily modify and extend them. FIG. 8 shows a block diagram of the structure of the dialog module 222. The dialog module 222 comprises intrinsic dialogs 810, external dialogs 812 and a dialog manager 814.

Intrinsic dialogs 810 are either fundamental actions (such as stroke display) or complex actions (such as various kinds of error correction). The intrinsic dialogs 810 include basic editing functions such as character deletion, character insertion and character replacement. The intrinsic dialogs 810 also include basic forms of error correction such as: (1) modifying the bit field 736 of the result structure 720 to reflect a different active result 730, (2) replacing a stroke with its recognized result, and (3) displaying a soft keyboard). The intrinsic dialogs 810 shown in FIG. 8 are a delete character dialog 824 and an insert character dialog 826.

External dialogs 812 are similar to an editor or spreadsheet macro. They can be created, modified and deleted by a software application developer. The external dialogs 812 use rules to define transactions on the database 212. The external dialogs 812 include the various responses to handwritten input reaching the end of the application window 138. These responses include scrolling the input to the left, dynamically extending the application window 138, and allowing the user 128 to continue in the adjacent application window 138. The external dialogs 812 also include complex editing functions, such as flowing input to form justified paragraphs, and cut and paste movement of input among application windows 138. The external dialogs 812 shown in FIG. 8 are a delete word dialog 830, an insert word dialog 832 and an un-do dialog 828.

The external dialogs 812 are written in a programming language which may be uniquely defined for this purpose or which may be an existing language such as Prolog or C. Each external dialog 812 is specified as a set of "if-then" rules in which the actions are governed by stroke data input by the user 128 and by results obtained from operations on the database 212. The external dialogs 812 are contained in a dialog file which is loaded at the time the application program 126 is initialized. The external dialogs 812 may then be compiled as part of the initialization, or may be interpreted when activated.

The dialog manager 814 is an engine for executing or interpreting the dialogs.

Figure 4:
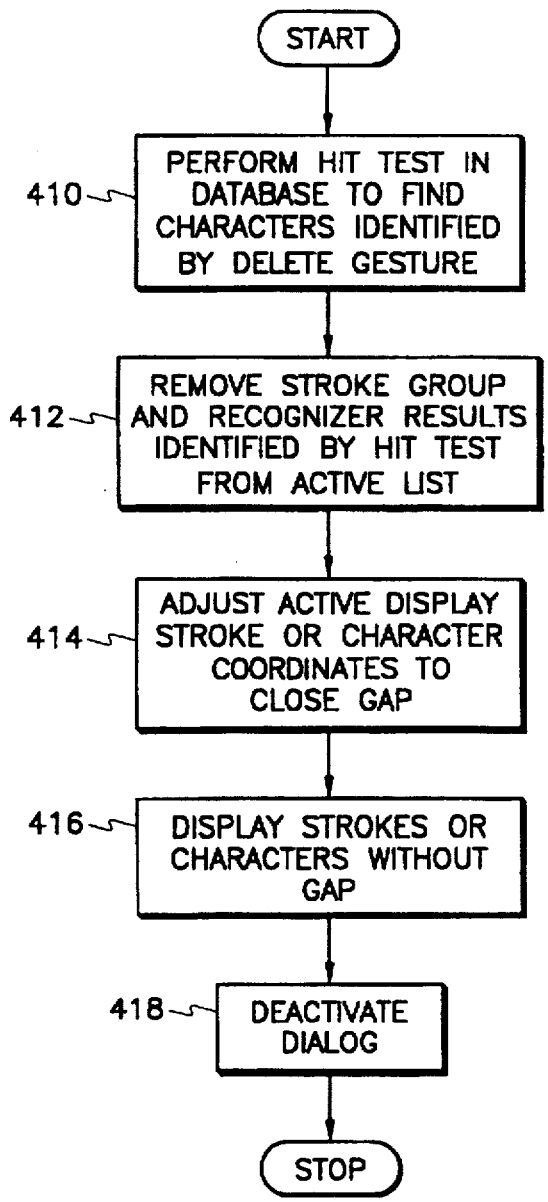
FIG. 4 is a flowchart of the operation of a deletion dialog of FIG. 2.

FIG. 4 is a flowchart which illustrates the operation of the delete character dialog 824 of deleting a single character which is displayed in either stroke or recognized form. The gesture which caused this intrinsic dialog to be activated (in the step 388 of FIG. 3E) could be, for example, a vertical stroke drawn through the character or stroke group to be deleted. Looking at FIG. 4, in a step 410 the writingD widget 220 commands the database 212 to determine the character or strokes intercepted by the delete gesture. The hit test primitive 620 of the database 212 then locates the entry on the stroke group list 712 whose positional data 718 corresponds to the display coordinates of the gesture.

In a step 412, the writingD widget 220 commands the database 212 to deactivate the located entry by removing it from the active list 610. The entry is not destroyed, but is retained on the inactive list 612 in case the user 128 subsequently invokes the un-do dialog 828 to restore the deleted character.

In a step 414, the writingR widget 218 invokes the database primitives 614 to adjust the positional data 718 of any remaining unrecognized stroke group entries 720 (for a stroke group) or recognized stroke group entries 726 (for a character) on the active list 610 so as to over-write the deleted character. The database 212 then calls back the writingA widget 210 in step 416 to cause the strokes or characters on the active list 610 to be re-displayed without the deleted character. The delete character dialog 824 is then deactivated, as shown in a step 418. The method of the delete word dialog 830 is similar, except that it is invoked with a different gesture and it manipulates the word list 744 rather than the stroke group list 712.

Figure 5A:
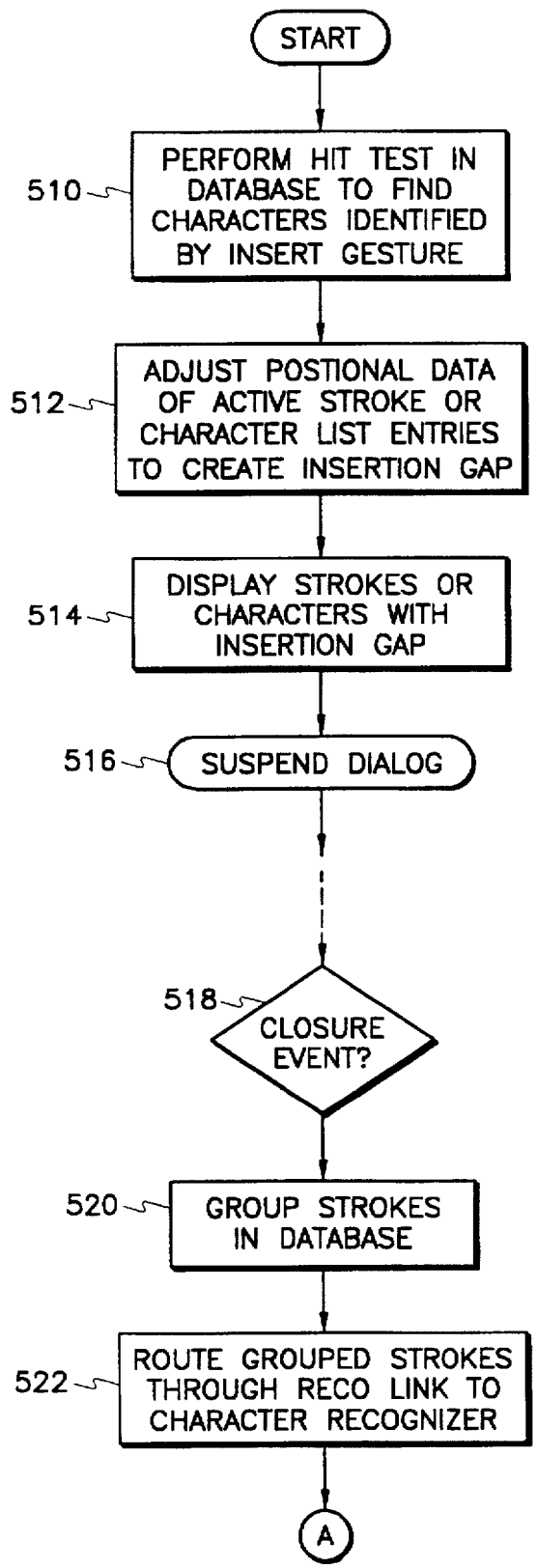
FIGS. 5A and 5B show a flowchart of the operation of an insertion dialog of FIG. 2.
Figure 5B:
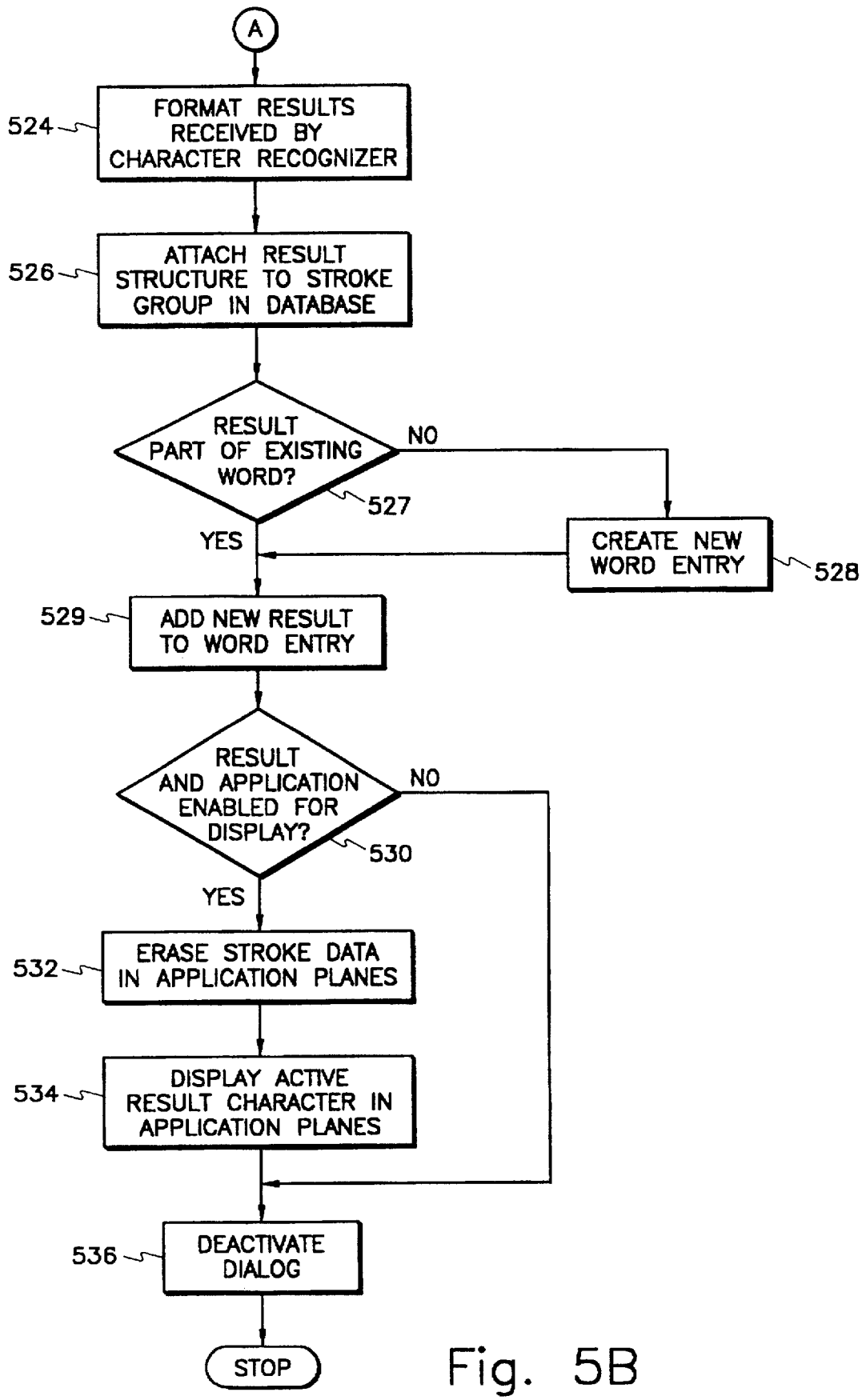

FIGS. 5A and 5B show a flowchart which illustrates the operation of the insert character dialog 826 for inserting a character in an existing displayed string, which may be either handwritten or recognized. In a step 510 of FIG. 5A, the hit test primitive 620 responds to a command by the writingD widget 220 to locate the entry on the stroke element list 710 or the stroke group list 712 whose positional data 718 corresponds to the display coordinates of the gesture.

In a step 512, the writingR widget 218 invokes the database primitives 614 to adjust the positional data 718 of the unrecognized stroke group entries 720 or recognized stroke group entries 726 so as to produce a gap where a new character may be inserted. The database 212 then calls back the writingA widget 210 in step 514 to display the strokes or data with the insertion gap. Execution of the insert character dialog 826 is then suspended (but not deactivated) in a step 516 to receive a stroke from the user 128.

Execution returns to the writing widgets 210, 218 and 220 at the step 312 of FIG. 3A. The writing widgets 210, 218 and 220 process the stroke entered by the user 128, and then execute the insert character dialog 826 in the step 390 of FIG. 3E.

Upon being executed with the new stroke, the insert character dialog 826 determines (in a step 518 of FIG. 5A) whether there has been a closure event. If not, the dialog is again suspended to receive a stroke. Once there has been a closure event, then the insert character dialog 826 carries out steps 520 through 536 of FIGS. 5A and 5B to recognize the character entered, add it to a word list entry 752, and display it in place of the entered strokes. Steps 520 through 534 are identical to steps 350 through 364 of FIGS. 3B and 3C, which are described above. Finally, in a step 536, the insert character dialog 826 is deactivated.

The insert word dialog 832 operates in a similar manner, except that it is invoked with a different gesture and it operates on the word level rather than the character level.

Figure 9:
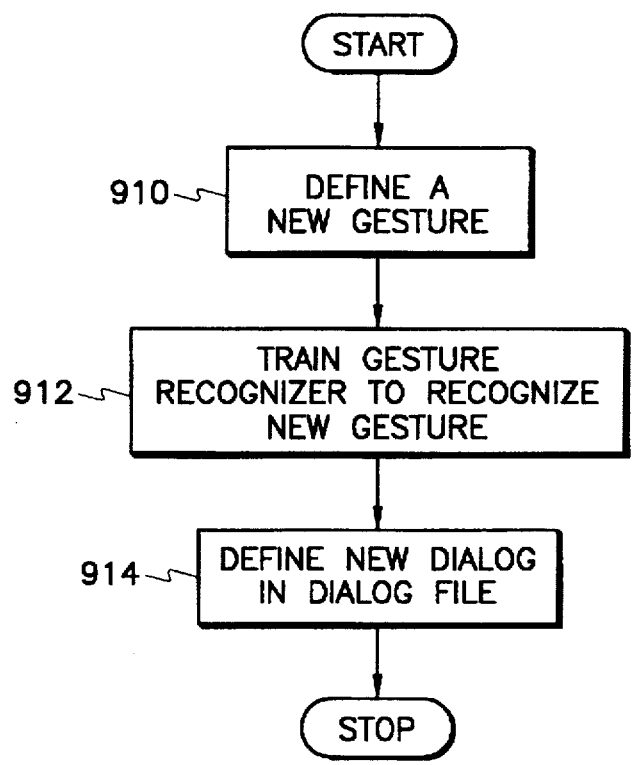
FIG. 9 is a flowchart of the method for creating a dialog of the dialog module of FIG. 8.

The external dialogs 812 are readily added, removed or modified by editing the dialog file. No modification of the source code of the TAPI 110 itself is required. FIG. 9 shows a flowchart of the method for creating a new dialog. First, in a step 910, the software application developer defines a new invocation stroke (i.e., the gesture with which the user 128 will invoke the new dialog). Second, in a step 912, the application developer trains the gesture recognizer 125 to recognize the new gesture and to return a new dialog identification code to the TAPI 110 when it is recognized. Training may consist of capturing several copies of the invocation stroke data and inserting them in the gesture prototype data set 146 of the gesture recognizer 125.

Finally, in a step 914, the developer defines the new dialog in the dialog file. The dialog definition consists of "nouns" and "verbs" which act upon the nouns. The nouns correspond to properties of the dialog strokes such as the invocation stroke and any subsequent strokes received by the dialog. The subsequent strokes are input strokes to the dialog, including gestures and characters.

The properties further include any stroke element entries 714, stroke group entries 720 or word list entries 752 identified by the invocation stroke. For example, in the case of the delete character dialog 824, the invocation stroke identifies the stroke element entry 714 of a stroke to delete or the stroke group entry 720 of a character to delete.

The verbs are database primitives 614 or macros for carrying out the action of the dialog. Macros comprise database primitives 614 or other dialogs. Both the macros and the other dialogs are contained in the dialog file.

To remove a dialog, the software application developer removes the dialog entry from the dialog file and removes the associated gesture from the gesture prototype data set 146. To modify a dialog, the software application developer edits the dialog file.

Note that if the software application developer had access to the source code of the TAPI 110, he or she could create an external dialog 812 by incorporating its features in the software of the gesture recognizer 144. The software application developer could delete an external dialog 812 incorporated into the gesture recognizer 144 by removing it from the gesture recognizer 144, and he or she could modify it by modifying the gesture recognizer 144.

CONCLUSION

While the invention has been particularly shown and described with reference to preferred embodiments thereof, it will be understood by those skilled in the art that the foregoing and other changes in form and details may be made therein without departing from the spirit and scope of the invention.

Having thus described our invention, what we claim as new and desire to secure by Letters Patent is:

1. A computer-based method for disambiguating a stylus stroke made on a digitizing tablet, the digitizing tablet being an input device to a computer running at least one application program having one or more application windows, comprising the steps of:

(a) receiving an x-y data representative of the stylus stroke made on the digitizing tablet;

(b) generating stroke events to indicate a pen-up event, a pen-down event, and a stylus position on the digitizing tablet;

(c) converting said x-y data generated between said pen-down event and said pen-up event to relative coordinates of a display device to generate a stroke element entry;

(d) offering said stroke events to an application window for acceptance;

(e) writing said stroke element entry to a database if the application window accepted said stroke events offered in said step (d);

(f) detecting the occurrence of a closure event;

(g) forming a group of all non-gesture strokes received since a previous closure event into an unrecognized stroke group;

(h) providing said unrecognized stroke group to a character recognizer where a recognition algorithm is performed;

(I) receiving results of said recognition algorithm from said character recognizer;

(j) converting said unrecognized stroke group into a recognized stroke group based on said results received from said recognizer;

(k) determining whether there is an existing word entry in said database with which a character comprising said recognized stroke group is associated;

(l) inserting said recognized stroke group into said database, if said recognized stroke group is associated with said existing word entry;

(m) creating a new word entry, if said recognized stroke group is not associated with said existing word entry, without user intervention; and (n) inserting said recognized stroke group into said new word entry created in said step (m).

2. The method of claim 1, further comprising the steps of:

(o) notifying the application window that said stroke element entry is in said database;

(p) retrieving said positional data from said stroke element entry; and (q) processing said positional data.

3. The method of claim 2, further comprising the steps of:

(r) writing said database to a file upon a request to suspend said application program; and (s) restoring said database from said file upon a request to resume said application program.

4. The method of claim 1, further comprising the step of storing said stroke element entry in a stroke data cache while the stroke event is offered in said step (d) and deleting said stroke element entry from said stroke data cache after said stroke element entry is routed in said step (e).

5. The method of claim 1, further comprising the steps of:

(o) inking an inking plane of a display device of the digitizing tablet to display x-y data input by said stylus after said x-y data is received;

(p) erasing said x-y data in said inking plane after said stroke element entry is entered in said database in said step (e); and (q) displaying the stroke in an application window on said digitizing tablet.

6. A computer-implemented system for disambiguating a stylus stroke made on a digitizing tablet, the digitizing tablet being an input device to a computer running at least one application program having one or more application windows, comprising:

means for receiving an x-y data representative of the stylus stroke made on the digitizing tablet;

means for generating stroke events to indicate a pen-up event, a pen-down event, and a stylus position on the digitizing tablet;

means for converting said x-y data generated between said pen-down event and said pen-up event to relative coordinates of a display device to generate a stroke element entry;

means for offering said stroke events to an application window for acceptance;

means for writing said stroke element entry to a database if the application window accepted said stroke events;

means for detecting the occurrence of a closure event;

means for forming a group of all non-gesture strokes received since a previous closure event into an unrecognized stroke group;

means for providing said unrecognized stroke group to a character recognizer where a recognition algorithm is performed;

means for receiving results of said recognition algorithm from said character recognizer;

means for converting said unrecognized stroke group into a recognized stroke group based on said results received from said recognizer;

means for determining whether there is an existing word entry in said database with which a character comprising said recognized stroke group is associated;

means for inserting said recognized stroke group into said database, if said recognized stroke group is associated with said existing word entry;

means for creating a new word entry, if said recognized stroke group is not associated with said existing word entry, wherein said means for creating a new word entry is without user intervention; and means for inserting said recognized stroke group into said new word entry.

7. The system of claim 6, further comprising:

means for notifying the application window that said stroke element entry is in said database;

means for retrieving said positional data from said stroke element entry; and means for processing said positional data.

8. The system of claim 7, further comprising:

means for writing said database to a file upon a request to suspend said application program; and means for restoring said database from said file upon a request to resume said application program.

9. The system of claim 6, further comprising:

means for comparing said stroke element entry to sample gestures in a sample gesture data set to determine if said stroke element entry matches one of said sample gestures;

means for determining a dialog identification code identifying a dialog associated with a matching sample; and means for executing said dialog identified by said dialog identification code.

10. The system of claim 9, further comprising:

means for defining a new invocation stroke and a new dialog identification code;

means for inserting in a prototype data set gesture positional data representative of said new invocation stroke; and means for creating a new dialog, identified by said new dialog identification code, wherein said new dialog comprises database manipulations to be performed when said stroke element entry matches a sample gesture corresponding to said new invocation stroke.

11. The system of claim 9, further comprising:

means for deleting an unwanted invocation stroke;

means for deleting gesture positional data representative of said unwanted invocation stroke; and means for deleting database manipulations to be performed when said stroke element entry matches a sample gesture corresponding to said unwanted invocation stroke.

12. The system of claim 9, further comprising means for modifying a definition of an invocation stroke and a dialog identification code in a gesture recognizer.

13. The system of claim 9, further comprising means for modifying in a prototype data set positional data representative of an invocation stroke.

14. The system of claim 9, wherein said dialog is a delete dialog and further comprising:

means for determining a character identified by said delete dialog;

means for removing said identified character from an active list of said database;

means for adjusting positional data of remaining entries in said active list; and means for displaying remaining entries without any gap.

15. The system of claim 9, wherein said dialog is a delete dialog, further comprising:

means for determining a stroke identified by said delete dialog;

means for removing said identified stroke from an active list of said database;

means for adjusting positional data of remaining entries in said active list; and means for displaying remaining entries without any gap.

16. The system of claim 6, further comprising means for storing said stroke element entry in a stroke data cache while the stroke event is offered to said application window and deleting said stroke element entry from said stroke data cache after said stroke element entry is routed to said application window.

17. The system of claim 6, further comprising:

means for inking an inking plane of a display device of the digitizing tablet to display x-y data input by said stylus after said x-y data is received;

means for erasing said x-y data in said inking plane after said stroke element entry is entered in said database; and means for displaying the stroke in an application window on said digitizing tablet.

* * * * *